Jan. 17, 1950   W. S. GODWIN   2,494,869
DOWEL ASSEMBLY FOR CONCRETE ROAD JOINTS
Filed Jan. 29, 1945   2 Sheets-Sheet 1
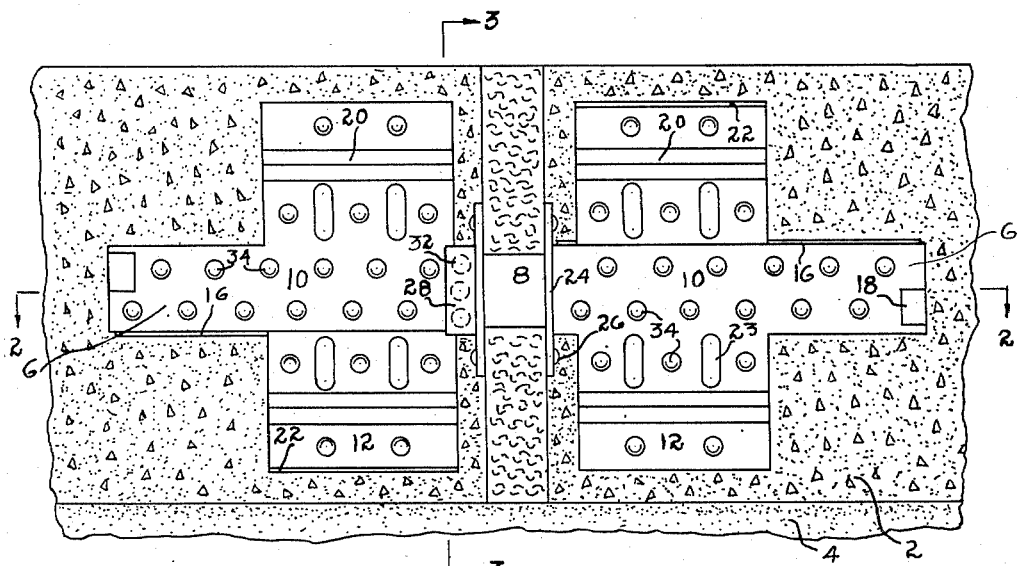
Fig. 1
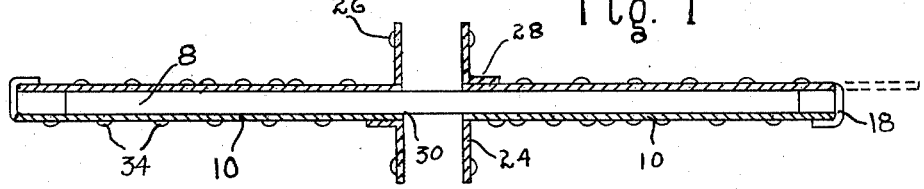
Fig. 2
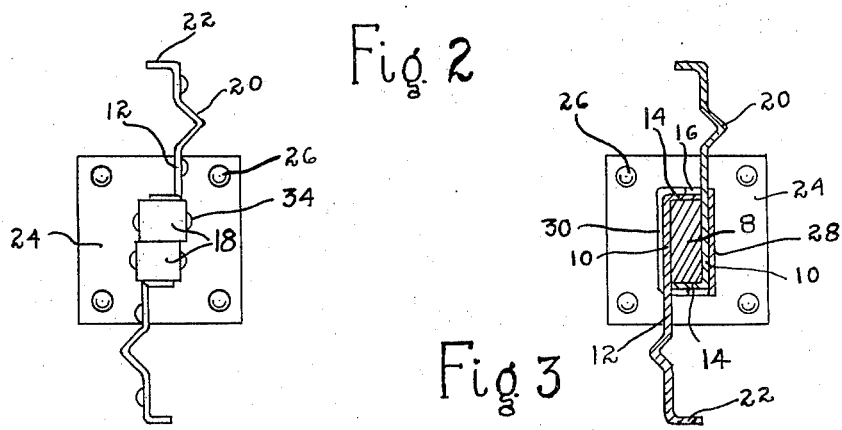
Fig. 3
Fig. 4
Inventor
William S. Godwin
By Bailey, Stephens & Huettig
Attorneys

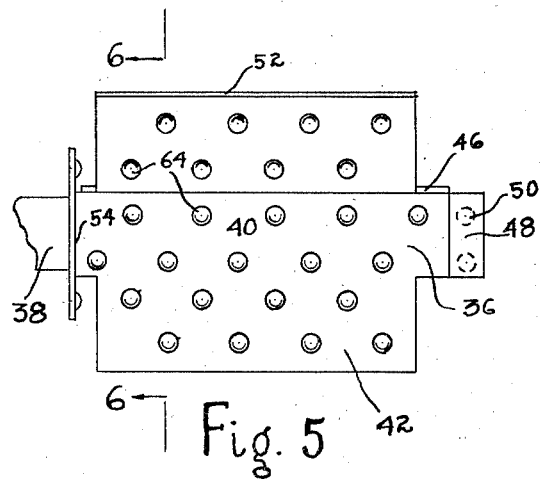
Fig. 5
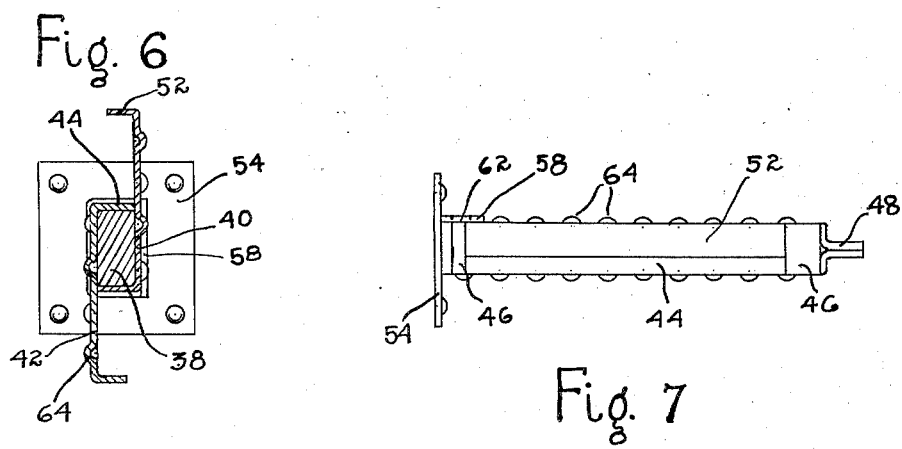
Fig. 6
Fig. 7
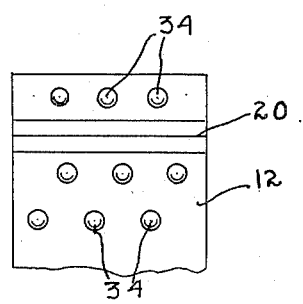
Fig. 8
Inventor
William S. Godwin
By Bailey, Stephens & Huettig
Attorney Patented Jan. 17, 1950

2,494,869

UNITED STATES PATENT OFFICE 2,494,869

DOWEL ASSEMBLY FOR CONCRETE ROAD JOINTS

William S. Godwin, Baltimore, Md.

Application January 29, 1945, Serial No. 574,981

9 Claims. (Cl. 94—8)

My invention relates to dowel assemblies for concrete road joints, and especially to assemblies of this type which have no support from the road-bed when in use.

The primary object of the invention is to provide a dowel assembly which is completely adequate under all permissible loads on the roadway, but which at the same time is simple and inexpensive.

Another object of the invention is to produce such an assembly which is formed of the least possible number of parts and can be manufactured in a few, simple operations while using the least amounts of metal.

A further object of the invention is to provide a dowel assembly in which the sockets for the dowel are formed of two identical sheet-metal parts, so that only one die is needed for forming the sockets.

Still another object of the invention is to produce a dowel in which such similar sheet-metal parts also include reinforcing members to be set in the concrete.

Another object of the invention is to provide a dowel socket in which the two similar sheet-metal members are held together at their inner ends by the flange unit which engages the filler strip.

A further object of the invention is to provide, in an assembly of this type, members to be embedded in the concrete which provide both horizontal and vertical bearing areas above and below the dowel; such areas being so arranged as to permit the concrete when poured to reach substantially all of such areas when it is poured.

An additional object of the invention is to provide a dowel construction in which vertical plates are provided above and below the dowel, with means integral with the plates to transmit downward loads on the dowel to the upper plate and vice versa, so that such loads put the plates in tension, rather than compression.

A further object of the invention is to produce a dowel assembly in which the inner parts only of the dowels are provided with special means for transmitting loads to the concrete, since the major load is concentrated on these portions of the dowels. This feature is especially important in connection with dowels which do not rest on the sub-grade.

An additional object of the invention is to provide, in a dowel assembly, a socket member formed of sheet metal having both bearing and bond for transmitting loads to the concrete, and provided with deformations to increase the bond in the plane in which the bearing is supplemented by the bond. More particularly, the invention contemplates the provision of such deformations in the vertical walls of a socket member in which a dowel fits with a snug sliding fit. Such an arrangement simultaneously prevents the sheet metal walls from bending inward to reduce the bonding effect of the deformations and reduces the friction between the dowel and the socket.

The use of all the various features hereinabove described is not essential in all forms of the invention. For example, as will be explained below, the transmission of the load in tension to the fins, and the deformations of the sheet and the special mode of assembly may be used in connection with a dowel socket in which the fins extend practically the full length of the socket. In other words, my invention contemplates several features which may be used either separately or in combination.

Further objects and advantages of the invention will appear more fully from the following description, particularly when taken in conjunction with the accompanying drawings which form a part thereof.

In the drawings:

Fig. 1 is a cross-section through a road joint showing a dowel system embodying my invention therein.

Figs. 2 and 3 are cross-sections on the lines 2—2 and 3—3 respectively of Fig. 1.

Fig. 4 is an end view of the assembly.

Fig. 5 shows in elevation a modified form of socket member.

Fig. 6 is a cross-section on the line 6—6 of Fig. 5.

Fig. 7 is a top plan view of the socket of Fig. 5.

Fig. 8 is an elevation of still another form of fin.

As shown in the drawings, the dowel structure is intended to bridge the expansion joint between two concrete road sections 2 resting on a subgrade 4. The dowel assembly consists of socket members 6, one in each road section, and a dowel 8 slidable in the sockets.

Each socket is formed of three parts. Two of these parts are alike, each consisting of a main wall section 10 having a fin 12 extending therefrom in the plane of the wall section, this plane being parallel to the longitudinal axis of the dowel and perpendicular to the joint. At the other edge of the wall section is an inwardly turned horizontal flange 14. It will be noted that the fins extend only about half the length of the main wall sections. Along the remainder of its length, on the same edge as the fin, each wall section has an inwardly turned flange 16. At the end of the wall section is tab 18 which, when the part is manufactured, lies in the plane of the wall section as shown in broken lines in Fig. 2. Each fin has a V-shaped or other suitable groove 20 parallel with the longitudinal axis of the main body portion forming inclined load-distributing surfaces. The free end of the fin is bent over to form a horizontal flange 22. The fin also has slots 23 cut in it.

The third part of the socket is a flange member consisting of a flat plate 24 having dimples 26 near its corners. At the center, a rectangular piece 28 is cut out on three sides and bent at right angles along one of its longer sides to form an opening 30. The longer dimension of the tab is slightly greater than the width of the main wall section 10.

The dowel 8 is a plain steel bar of rectangular cross-section such as to fit slidingly in the socket members, and a length substantially twice the length of a socket member; so that when the sockets are assembled in spaced relation across the joint, as shown in Fig. 1, the dowel has some longitudinal play in them.

The vertical wall of each socket part 10 and fin 12 is provided with a series of deformations of the sheet metal out of its plane, forming dimples 34. The socket member is held in position within the cement and transfers its loads thereto through both bearing (by the top and bottom walls 14 and flanges 22) and bond (by adhesion of the concrete to the side walls 10 and flanges 12). The dimples increase substantially the resistance of the flanges and side walls to movement in the concrete and thus improve the bond. This improvement is effective in vertical planes parallel to the axis of the dowel and perpendicular to the joint, and thus act in the same planes as the bearing. The combination of bearing and increased bond, acting together, is especially effective and allows the transfer of the necessary loads with smaller dowel units.

If the socket walls were unsupported, vertical forces would tend to push them inwardly, through camming action on the dimples, and thus to render the bond between these walls and the concrete less secure. To avoid this, the solid dowel is made to have a snug sliding fit in the socket, at least in the horizontal direction. At the same time, the dimples reduce the area of contact between the dowel and the socket walls and thus reduce the friction which opposes the sliding of the dowel in the socket.

The fins are, of course, in contact on both faces with the concrete. In these, therefore, the concrete will enter the concave sides of the dimples and will prevent their displacement in such a manner as to insure their bonding effect.

In assembling the device, one main wall section is connected to the flange section by inserting its end adjacent fin 12 into opening 30 and bearing against tab 28, to which it is spot-welded as at 32. The tab 18 is still in the plane of the main wall section. The other main wall section, in inverted position with relation to the first one, is now pushed into the hole 30, and is placed against the first section so that flanges 14, 16 overlie each other. The tabs 18 are then bent around the ends of the mating sections, and the socket unit is complete. Its sides are formed by the main wall sections 10, its top and bottom by flanges 14, 16, and its end by tabs 18. This produces a closed socket which will effectively prevent concrete from coming into contact with the dowel to prevent its sliding. The dowel assembly is completed by placing socket members on opposite ends of a dowel. It is embedded in the concrete in the usual manner when the road is built, with the fins in vertical planes.

Any downward load on the dowel is transmitted to the flange 14, and through it to the upper fin 12, thus transferring a tensional load to the fin. Very little of such downward load is carried by the lower fin. Similarly, upward loads are transmitted in tension to the lower fin 12. Also, I have found that the greater percentage of the load on the dowel is carried by the inner half, that is, the half nearer the joint. For that reason the fins in this form extend along the inner half only of the socket member, thus saving a considerable amount of metal. These fins are rectangular and are thus located within the vertical extension of the inner half of the socket.

It will be noted that the front ends of the two socket parts are held together only by engagement in hole 30 of the flange 24. Also, the two main wall parts are exactly alike and may be stamped out in large quantities by a single machine. V-shaped grooves 20 give a bond with the concrete on inclined surfaces, while flanges 22 give a horizontal bearing, all the parts have small horizontal thickness, so that the concrete will flow under them without leaving gaps such as are likely to occur with wider members.

Figs. 5 to 7 show a socket member embodying a modified form of the invention. In this form the socket 36 is formed by two like sheet metal parts, each having a plane vertical wall portion 40 and a co-planar fin 42. The fin and socket each are provided with deformations or dimples 64. The fin is lower than that of Figs. 1 to 4, and extends substantially the full length of the socket. The top and bottom walls 44 are formed, as in Figs. 1 to 4, by flanges integral with the side walls on the opposite edges from the fins. The fins are provided at their free edges with horizontal flanges 52. Dowel 38 has a snug sliding fit within the socket.

One of the socket parts is welded at its front end, as at 62, to a flange 58 struck out of an opening in flange 54. The corresponding end of the other socket member fits in this opening. At the other end, the walls 40 are bent inward and then again parallel to each other, as at 48, and the two parallel portions are spotwelded together at 50. Tabs 46 bent over from the end of portions of the top wall adajcent the flanges 42, and overlying walls 44, also aid in holding the parts together.

This device operates and is used in the same manner as that shown in Figs. 1 to 4.

Fig. 8 shows another form of fin, which differs from that of Figs. 1 to 4 in the omission of the openings 23.

While I have described herein one embodiment of my invention, I wish it to be understood that I do not intend to limit myself thereby except within the scope of the appended claims.

I claim:

1. A socket for road joint dowel assemblies comprising two similar sheet metal parts each having a flat elongated wall section, a flange along one longitudinal edge of such section, and a fin extending from the other edge in the plane of the section, said parts being assembled together in inverted relation to form an elongated socket of which the flat sections form the vertical walls and the flanges the top and bottom walls, means on said parts securing them together at one end and closing one end of the socket and means connecting the other ends of the parts together while leaving the end of the socket open.

2. In a socket as claimed in claim 1, said fins being connected substantially only to the halves of the parts adjacent the open end of the socket.

3. In a socket as claimed in claim 1, said last means comprising a flange member having an opening therein secured to one of said parts, the end of the other part extending into said opening.

4. In combination with a device as claimed in claim 1, a dowel within said socket having a snug sliding fit at least with said vertical walls, each such vertical wall having portions deformed outwardly out of the plane thereof to increase the vertical bond between said wall and the concrete and to reduce the friction between the wall and the dowel.

5. In a road joint dowel assembly, means forming a socket open at one end, said means including a sheet metal member having a part arranged in a vertical plane forming one side wall of the socket, a dowel within said socket having a snug sliding fit at least with said side wall, said side wall having portions deformed outwardly out of the plane thereof to increase the vertical bond between said wall and the concrete and to reduce the friction between the wall and the dowel.

6. In a device as claimed in claim 5, a sheet metal fin connected to said wall and arranged in a vertical plane, said fin being exposed on both sides for access of concrete thereto, said fin having portions deformed out of the plane thereof to increase the vertical bond between said fin and the concrete.

7. A socket part for road joint dowel assemblies comprising an elongated sheet metal member having a substantial part of one of its longitudinal edges turned over to form a flange and having a fin extending from the opposite edge, said member forming a side wall and said flange forming a part of one of the top and bottom walls of a dowel socket, means secured to said member forming the remainder of the walls of the socket, and a dowel within said socket having a snug sliding fit with said side wall, said side wall having portions deformed outwardly out of the plane thereof to increase the vertical bond between said wall and the concrete and to reduce the friction between the wall and the dowel.

8. A socket for road joint dowel assemblies comprising two similar sheet metal parts, a flange along one edge of each of said parts, and a fin extending from each of said opposite edges, said parts being assembled together in inverted relation to form a socket in which the flanges form the top and bottom walls and the fins extend substantially vertically from the socket each in a direction opposite to the top or bottom wall to which it is connected whereby the major portion of loads exerted upon the top or bottom walls is carried by the part to which said wall is connected.

9. A socket for road joint dowel assemblies comprising two similar sheet metal parts each having a flat elongated wall section, a flange along one longitudinal edge of such section, and a fin extending from the other edge in the plane of the section, said parts being assembled together in inverted relation to form an elongated socket of which the flat sections form the vertical walls and the flanges the top and bottom walls, and means on said parts securing them together.

WILLIAM S. GODWIN.

REFERENCES CITED

The following references are of record in the file of this patent:

UNITED STATES PATENTS

| Number | Name | Date |
|---|---|---|
| 1,242,039 | Ratner | Oct. 2, 1917 |
| 1,880,013 | Briody | Sept. 27, 1932 |
| 1,988,269 | Fink | Jan. 15, 1935 |
| 2,060,326 | Lampert | Nov. 10, 1936 |
| 2,108,393 | Schulz | Feb. 15, 1938 |
| 2,189,156 | Willard | Feb. 6, 1940 |
| 2,201,134 | Brickman | May 21, 1940 |
| 2,208,454 | Geyer et al. | July 16, 1940 |
| 2,263,150 | Westcott | Nov. 18, 1941 |
| 2,361,828 | Drayer | Oct. 31, 1944 |